(12) United States Patent
Samukawa et al.

(10) Patent No.: US 8,168,255 B2
(45) Date of Patent: May 1, 2012

(54) COATING METHOD AND MANUFACTURING METHOD OF PHOTOCHROMIC LENS

(75) Inventors: Masahiko Samukawa, Tokyo (JP); Norihisa Tanaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 1571 days.

(21) Appl. No.: 10/588,084

(22) PCT Filed: Feb. 2, 2005

(86) PCT No.: PCT/JP2005/001485
§ 371 (c)(1), (2), (4) Date: Aug. 25, 2006

(87) PCT Pub. No.: WO2005/075109
PCT Pub. Date: Aug. 18, 2005

(65) Prior Publication Data
US 2008/0003356 A1 Jan. 3, 2008

(30) Foreign Application Priority Data
Feb. 6, 2004 (JP) .................................. 2004-030909

(51) Int. Cl.
*B05D 3/12* (2006.01)
(52) U.S. Cl. .................. 427/240; 427/425; 427/427.3; 118/52; 118/320; 118/323
(58) Field of Classification Search .................. 427/240, 427/425, 427.3; 118/52, 320, 323
See application file for complete search history.

(56) References Cited

U.S. PATENT DOCUMENTS

| | | | | |
|---|---|---|---|---|
| 4,451,507 A | * | 5/1984 | Beltz et al. | 427/240 |
| 5,395,803 A | * | 3/1995 | Adams | 438/780 |
| 6,352,747 B1 | * | 3/2002 | Blackburn et al. | 427/425 |
| 6,371,667 B1 | | 4/2002 | Kitano et al. | |
| 2002/0041929 A1 | * | 4/2002 | Magne | 427/240 |
| 2002/0150679 A1 | | 10/2002 | Minami et al. | |

FOREIGN PATENT DOCUMENTS

| | | |
|---|---|---|
| EP | 1 150 168 A2 | 10/2001 |
| JP | A 2000-350955 | 12/2000 |

(Continued)

OTHER PUBLICATIONS

Australian Search Report issued in Australian Patent Application No. 2005210321 on Nov. 11, 2009.
Aug. 3, 2010 Supplementary European Search Report issued in EP 05 70 9606.

(Continued)

*Primary Examiner* — Kristen Jolley
(74) *Attorney, Agent, or Firm* — Oliff & Berridge, PLC

(57) ABSTRACT

To manufacture a photochromic lens by uniformly applying a coating liquid having a photochromic function without leaving an uncoated area, with a minimum necessary coating amount. There is provided a manufacturing method of the photochromic lens for dripping and applying a coating liquid 9 having the photochromic function onto a coating surface 2 of a spectacle lens, while rotating a spectacle lens 1, and forming a photochromic film having the photochromic function on the coating surface, comprising dripping (ring-shaped drip part 25) the coating liquid in a ring shape in the vicinity of an outer circumference on the coating surface of the spectacle lens, and thereafter dripping (spiral-shaped drip part 26) the coating liquid in a spiral shape toward a geometrical center or an optical center of the spectacle lens from the vicinity of the outer circumference, wherein the coating surface has a convex curved shape, and a viscosity of the coating liquid is 25 to 500 cps at 25° C.

18 Claims, 3 Drawing Sheets

FOREIGN PATENT DOCUMENTS

| | | |
|---|---|---|
| JP | A 2002-177852 | 6/2002 |
| JP | A-2003-117477 | 4/2003 |
| JP | A 2004-95726 | 3/2004 |
| WO | WO 00/58023 A2 | 10/2000 |

OTHER PUBLICATIONS

May 27, 2011 Office Action issued in European Patent Application No. 05709606.7.

* cited by examiner

COATING METHOD AND MANUFACTURING METHOD OF PHOTOCHROMIC LENS

TECHNICAL FIELDS

The present invention relates to a coating method for coating a body to be coated with a coating liquid, and to a manufacturing method of a photochromic lens for manufacturing the photochromic lens by coating a lens with the coating liquid having a photochromic function and curing its coating layer.

BACKGROUND ART

Patent document 1 discloses a coating apparatus for coating a spectacle lens with a coating liquid. In this coating apparatus, a spectacle lens is held by a rotatavely driven lens holder, and a dispenser for dripping the coating liquid is located immediately on the spectacle lens, and in this state, while rotating the spectacle lens, the coating liquid is dripped from the dispenser, and by the action of the centrifugal force, the surface of the spectacle lens is uniformly coated with the coating liquid, and by curing the coating layer, a functional film is applied.

Patent document 1: Japanese Patent Laid-Open No. 2002-177852

DISCLOSURE OF THE INVENTION

Problem to be Solved by The Invention

However, the functional film (coating film) thus applied by coating is a thin film having film thickness of about 3 μm, and the aforementioned coating method is excellent for forming such a thin film.

However, in a case of the coating liquid having high viscosity like the coating liquid having the photochromic function and which must be applied thick on the surface of the spectacle lens, in the aforesaid coating method, the coating liquid can not be applied uniformly on the surface of the spectacle lens without leaving an uncoated area.

In view of the above-described circumstances, an object of the present invention is to provide a coating method capable of uniformly coating a lens surface without leaving an uncoated area, with the minimum coating liquid. Also, the object of the present invention is to provide a manufacturing method of the photochromic lens for manufacturing the lens applied with the photochromic film on a coating surface, by coating the lens surface with the coating liquid having the photochromic function with the minimum coating liquid, uniformly without leaving the uncoated area.

Means to Solve The Problem

A first aspect of the present invention provides a coating method of dripping and applying a coating liquid on a coating surface of an object to be coated, while rotating the object to be coated, comprising:

dripping the coating liquid in a ring shape in the vicinity of a circumference on the coating surface of the object to be coated, and thereafter dripping the coating liquid in a spiral shape toward a geometrical center or an optical center of the object to be coated from the vicinity of the outer circumference.

A second aspect of the present invention provides the coating method according to the first aspect, wherein the coating surface of the object to be coated has a convex curved shape.

A third aspect of the present invention provides the coating method according to either of the first aspect or the second aspect, wherein a viscosity of the coating liquid is 25 to 500 cps at 25° C.

A fourth aspect of the present invention provides a manufacturing method of a photochromic lens of dripping a coating liquid having a photochromic function on a coating surface of the lens while rotating the lens, and forming a coating film having the photochromic function on the lens coating surface, comprising:

dripping the coating liquid in a ring shape in the vicinity of an outer circumference on the coating surface of the lens, and thereafter dripping the coating liquid in a spiral shape toward a geometrical center or an optical center of the lens from the vicinity of the outer circumference.

A fifth aspect of the present invention provides the manufacturing method of the photochromic lens according to the fourth aspect, wherein the coating surface of the object to be coated has a convex curved shape.

A sixth aspect of the present invention provides the manufacturing method of the photochromic lens according to either of the fourth aspect or the fifth aspect, wherein a viscosity of the coating liquid is 25 to 500 cps at 25°.

Advantages of The Invention

According to any one of the first aspect to third aspect, the coating liquid is dripped in a ring shape in the vicinity of the outer circumference on the coating surface of the object to be coated. Therefore, the vicinity of the outer circumference can be uniformly coated with the coating liquid without leaving an uncoated area. In addition, the coating liquid is dripped in a spiral shape toward the geometrical center or the optical center of the object to be coated from the vicinity of the outer circumference on the coating surface of the object to be coated. Therefore, the coating surface of the object to be coated has a convex curved shape, and the coating surface of the object to be coated can be uniformly coated with the coating liquid, even if there is a difference in the curved surface, such as the difference of a convex surface curve or the difference of spherical or aspherical surfaces. As a result, the vicinity of the outer circumference or inside of the coating surface of the object to be coated can be uniformly coated with the coating film with a thickness of several tens of μm without leaving an uncoated area, even if the coating liquid has a high viscosity (25 to 500 cps at 25° C.).

In addition, the coating liquid is dripped in a spiral shape toward the geometrical center or the optical center of the object to be coated from the vicinity of the outer circumference on the coating surface of the object to be coated. Therefore, the coating liquid is newly dripped on the coating liquid which is already dripped and flows by centrifugal force. The newly dripped coating liquid is prevented from being wastefully discharged, and a part of the coating surface not yet applied with the coating liquid is always coated with dripped coating liquid. Therefore, the coating liquid is prevented from being wastefully discharged, and a required minimum amount of the coating liquid can be maintained.

According to any one of the fourth to sixth aspects, the lens surface is coated with the coating liquid in such a manner that the coating liquid having the photochromic function is dripped on the coating surface in an appearance of a ring in the vicinity of an outer circumference on the coating surface of the lens. Therefore, the vicinity of the outer circumference is uniformly coated with the coating liquid without leaving an uncoated area. In addition, the coating liquid having the photochromic function is dripped in a spiral shape toward the geometrical center or the optical center of the lens from the vicinity of the outer circumference on the coating surface of the lens. Therefore, the coating surface of the lens has a convex curved shape, and the coating surface of the object to be coated can be uniformly coated with the coating liquid, even if there is a difference in the curved surface, such as the difference of a convex surface curve or the difference of spherical or aspherical surfaces. As a result, the vicinity of the outer circumference or inside of the coating surface of the object to be coated can be uniformly coated with the coating film with a thickness of several tens of μm without leaving an uncoated area, even if the coating liquid has high viscosity (25 to 500 cps at 25° C.).

The coating liquid having the photochromic function is dripped in a spiral shape toward the geometrical center or the optical center of the lens from the vicinity of the outer circumference on the coating surface of the lens. Therefore, the coating liquid is newly dripped on the coating liquid which is already dripped and flows by centrifugal force. The newly dripped coating liquid is prevented from being wastefully discharged, and a place of the coating surface not yet applied with the coating liquid is always coated with dripped coating liquid. Therefore, as described above, the coating liquid is prevented from being wastefully discharged, and a required minimum amount of the coating liquid can be maintained.

BEST MODE FOR CARRYING OUT THE INVENTION

The best mode for carrying out the invention will be explained based on the drawings.

FIG. 1 is a block diagram schematically showing a coating device that executes an embodiment of a manufacturing method of a photochromic lens according to the present invention.

A coating device 10 shown in FIG. 1 comprises a spin holder 11 whereby a spectacle lens 1 as an object to be coated is adsorbed and held; a dispenser 12 as a dripping device whereby coating liquid 9 (FIG. 3) is dripped on a coating surface 2 of the spectacle lens 1; and a controller 13 having a personal computer for control, wherein the controller 13 is connected to a data management server 14 in which shape data of the spectacle lens 1 is stored, via a communication cable 24.

As shown in FIG. 2, the spectacle lens 1 has a front surface as the coating surface 2 with a convex curved shape, and a rear surface 3 with a concave curved shape, respectively. O ring 15 (FIG. 2) of the spin holder 11 (FIG. 1) is brought into contact with the rear surface 3, and the spectacle lens 1 is adsorbed and held on the spin holder 11 by using the O ring 15. Two sets of the spin holder 11 are installed correspondingly to the spectacle lens 1, each being rotatably driven by a spin motor 16.

As shown in FIG. 1, two sets of the dispenser 12 are also installed correspondingly to the spectacle lens 1. Each dispenser 12 is provided so as to be ascendable/descendable with respect to the spectacle lens 1 held by the spin holder 11, by rotation of a dispenser motor 17. Further, these two sets of the dispenser 12 are provided so as to be simultaneously horizontally moved in a diameter direction of the spectacle lens 1 held by the spin holder 11. Note that these two sets of the dispenser 12 are fitted to an ascending/descending mechanism not shown, so as to be ascendable/descendable as whole with respect to the spectacle lens 1 held by the spin holder 11.

An edge spatula 21 is fixedly attached to the dispenser 12 in the vicinity of each nozzle 20. In addition, an edge sponge 22 is provided movably back and forth with respect to an end face 4 (edge) of the spectacle lens 1 held by the spin holder 11, by using an edge sponge cylinder (not shown) in the vicinity of each spin holder 11.

The aforementioned edge spatula 21 and the edge sponge 22 function in a step of smoothing the coating liquid 9 on the coating surface 2, after the coating liquid 9 is dripped from the dispenser 12 on the coating surface 2 of the spectacle lens 1. Specifically, while smoothing the coating liquid 9, by an action of the dispenser motor 17, the edge spatula 21 is depressed on the coating liquid 9 on the coating surface 2 of the spectacle lens 1 from upside to downside, and an extra coating liquid 9 is thereby scraped out. Also, while the coating liquid 9 is similarly smoothed, the edge sponge 22 is depressed on the end face 4 of the spectacle lens 1, whereby the end face 4 is coated with the coating liquid 9 and also the extra coating liquid 9 is sponged and removed.

The controller 13 is connected to the spin motor 16, the dispenser motor 17, a slide motor 18, and the edge sponge cylinder, etc, (not shown) via a communication cable 24, to control an operation of these motors and cylinders. Further, the controller 13 controls a dripping amount of the coating liquid 9 that is dripped from the dispenser 12, in accordance with the viscosity of the coating liquid 9.

Here, the coating liquid 9 has a photochromic function to be discolored by means of light irradiation including ultraviolet ray. The coating liquid 9 contains a photochromic compound, a radical polymeric monomer, and an amine compound, for example, and the radical polymeric monomer contains the radical polymeric monomer having a silanol group or a group for generating the silanol group by hydrolysis.

Further, specifically, the coating liquid 9 is composed by adding:

5 pts. wt. of γ-methacryloyloxypropyl trimethoxysilane,
20 pts. wt. of trimethylolpropane trimethacrylate,
35 pts. wt. of 2,2-bis (4-methacryloyloxypolyethoxyphenyl) propane,
10 pts. wt. of polyester oligomer hexaacrylate,
20 pts. wt. of polyethylene glycol diacrylate having average molecular weight of 532,
100 pts. wt. of polymeric monomer composed of 10 pts. wt. of glycidyl methacrylate,
3 pts. wt. of chromene 1, 5 pts. wt. of N-methyldiethanolamine, LS765 [mixture of biss(1,2,2,6,6-pentamethyl-4-piperidyl) sebacate
and methyl(1,2,2,6,6-petamethyl-4-piperidyl)sebacate;],
0.4 pts. wt. of CGI184 [1-hydroxycyclohexyl phenyl ketone] as polymerization initiator,
and
0.1 pts. wt. of CGI403 [bis(2,6-dimethoxybenzoyl)-2, 4, 4-trimethylpentylphosphine oxide].

Alternately, the coating liquid 9 is composed by adding:
5 pts. wt. of γ-methacryloyloxypropyl trimethoxysilane,
20 pts. wt. of trimethylolpropane trimethacrylate,
35 pts. wt. of 2,2-bis(4-methacryloyloxypolyethoxyphenyl) propane,
15 pts. wt. of polyester oligomer hexaacrylate,
15 pts. wt. of polyethylene glycol diacrylate having average molecular weight of 532,
100 pts. wt. of polymeric monomer composed of 10 pts. Wt. of glycidyl methacrylate,
3 pts. wt. of chromene 1, 5 pts. wt. of N-methyldiethanolamine,
5 pts. wt. of LS765,
0.4 pts. wt. of CGI184 as polymerization initiator, and
0.1 pts. wt. of CGI403.

Alternately, the coating liquid 9 is composed by adding:
5 pts. wt. of γ-methacryloyloxypropyl trimethoxysilane,
20 pts. wt. of trimethylolpropane trimethacrylate,
35 pts. wt. of 2,2-bis(4-methacryloyloxypolyethoxyphenyl) propane,
20 pts. wt. of polyester oligomer hexaacrylate, 10 pts. of polyethylene glycol diacrylate having average molecular weight of 532, 100 pts. wt. of polymeric monomer composed of 10 pts. wt. of glycidyl methacrylate, 3 pts. wt. of chromene 1, 5 pts. Wt. of N-methyldiethanolamine, 0.4 pts. wt. of CGI184 as polymerization initiator, and 0.1 pts. wt. of CGI403.

The aforesaid coating liquid 9 has high viscosity compared to a general coating liquid, and is 25 to 500 cps at 25° C. The coating surface 2 (see FIG. 2) of the spectacle lens 1 having a convex shape is coated with the coating liquid 9 with high viscosity, by a thickness of several tens of μm (such as 30 μm), and the photochromic film (not shown) is thereby formed. The reason why the photochromic film is formed by coating the coating surface thick with the coating liquid 9 is that the photochromic function of the spectacle lens 1 (i.e. photochromic lens) having this photochromic film is maintained for a long period of time. A film thickness of the photochromic film having the photochromic function is in a range from 10 to 100 μm, and preferably is in the range from 20 to 50 μm.

Further, the coating surface 2 of the spectacle lens 1 having the convex shape is coated with the coating liquid 9 by which the photochromic function is exhibited by the action of ultraviolet ray, and the rear surface 3 is not coated thereby. This is because light is made incident from the front surface, i.e. the coating surface 2 of the spectacle lens 1 and exits from the rear surface 3. A plurality of spectacle lenses 1 of recent years have an ultraviolet absorber, and this means that the ultraviolet ray is rarely contained in the light that reaches the rear surface 3. Accordingly, even if the rear surface 3 is coated with the coating liquid 9 having the photochromic function, the photochromic film formed of the coating liquid 9 does not exhibit the photochromic function. Therefore, in order to cause the photochromic film to exhibit a sufficient photochromic function, the coating surface 2 of the spectacle lens 1 having the convex shape is coated with the coating liquid 9 having the photochromic function.

The data management server 14 functions to store shape data of the spectacle lens 1 for each spectacle lens. The shape data includes a lens outer diameter D1 of the spectacle lens 1, a convex surface curve BC on the coating surface 2 of the spectacle lens 1, a concave surface curve B2 on the rear surface 3 of the spectacle lens 1, a thick center part CT of the spectacle lens 1, and a refraction index n of the spectacle lens 1.

In order to coat the coating surface 2 of the spectacle lens 1 having the convex shape with the photochromic film as the coating film by using the aforesaid coating device 10, by the control of the controller 13, the spin holder 11 is rotated, with the spectacle lens 1 held by the spin holder 11, the coating liquid 9 having the photochromic function is dripped from the nozzle 20 of the dispenser 12 located in the upper part of the spectacle lens 1, and during this time, the nozzle 20 of the dispenser 12 is temporarily stopped in the vicinity of the outer circumference of the spectacle lens 1, with the nozzle 20 being in not contact with the spectacle lens 1 held by the spin holder 11 and is then linearly moved from the vicinity of the outer circumference to the direction of the geometrical center or the optical center of the spectacle lens 1, in a non-contact state with the spectacle lens 1. By the rotation of the spectacle lens 1 by the spin holder 11 and moving operation of the nozzle 20, drip of the coating liquid 9 from the nozzle 20 of the dispenser 12 is performed in such a manner that, as shown in FIG. 3, the coating liquid 9 is dripped in an appearance of a ring shape in the vicinity of the outer circumference on the coating surface 2 of the spectacle lens 1, and thereafter, the coating liquid is dripped in a spiral shape toward the geometrical center or the optical center of the spectacle lens 1 from the vicinity of the outer circumference. Designation mark 25 in FIG. 3 shows a ring-shaped part where the coating liquid 9 is dripped, and designation mark 26 shows a spiral-shaped part where the coating liquid 9 is dripped.

Here, the vicinity of the outer circumference of the spectacle lens 1 refers to an area deviated from the outer circumference (i.e. end face 4) of the spectacle lens 1 to inside by dimension β (for example, 10 mm). The coating liquid 9 is dripped in the appearance of ring shape (for example, around one circumference), on a position of the aforesaid area deviated inward from the outer circumference (end face 4) of the spectacle lens 1 by dimension β (for example, 10 mm).

An initial position of the nozzle 20 of the dispenser 12 in the upper part of the spectacle lens 1 held by the spin holder 11, the position of the nozzle 20 of the dispenser 12 when the coating liquid 9 is dripped on the coating surface 2 of the spectacle lens 1 in a spiral shape, and a moving locus of the nozzle 20 in the dispenser 12 are determined by the controller 13, based on the shape data of the spectacle lens 1 stored in the data management server 14.

Specifically, as shown in FIG. 2, first, from a refraction index n of the spectacle lens 1 stored in the data management server 14 and the concave surface curve B2 of the rear surface 3 of the spectacle lens 1, a curvature radius R in the rear surface 3 of the spectacle lens 1 is calculated by using the following formula.

$$R = 1000 \times (n-1)/B2$$

Next, by using the curvature radius R, distance L from the top of O ring 15 in the spin holder 11 to the top P of the rear surface 3 in the spectacle lens 1 is calculated from the following formula.

[Formula 1]

Next, from the thick center part CT (i.e. the distance between the top P on the rear surface 3 of the spectacle lens 1 and the top O of the coating surface 2) of the spectacle lens 1 stored in the data management server 14 and the distance L, the position of the top O on the coating surface 2 of the spectacle lens 1 is calculated.

The initial position of the nozzle 20 of the dispenser 12 with respect to the spectacle lens 1 is set, so that a tip of the nozzle 20 is positioned in the upper part of a prescribed distance a (for example, 5 to 10 mm) from the top O, immediately above the top O on the coating surface 2 of the spectacle lens 1.

Also, when the coating liquid 9 is dripped on the coating surface 2 of the spectacle lens 1 in an appearance of a ring shape, the position of the nozzle 20 of the dispenser 12 is determined by using the outer diameter D1 of the spectacle lens 1 stored in the data management server 14 and the convex surface curve BC of the coating surface 2 of the spectacle lens 1. Specifically, first, an operation straight line B is set, which is tilted from the tip of the initial position of the nozzle 20 toward the coating surface 2 of the spectacle lens 1 at a prescribed angle θ. Next, the prescribed angle θ is set, taking the convex surface curve BC of the coating surface 2 of the spectacle lens 1 into consideration, so that the nozzle 20 is not brought into contact with the coating surface 2 of the spectacle lens 1 when the tip of the nozzle 20 is moved along the operation straight line B. Then, the position of the nozzle 20 of the dispenser 12 for dripping the coating liquid 9 in an appearance of the ring shape is determined, so that an intersecting point Q of a perpendicular line C drawn at the position located inward from the outer circumference of the spectacle lens 1 by dimension β becomes the tip position of the nozzle 20.

Further, the moving locus of the nozzle 20 in the dispenser 12 on dripping the coating liquid 9 on the coating surface of the spectacle lens 1 in a spiral shape corresponds to the operation straight line B which is set when the position of the nozzle 20 on dripping the coating liquid 9 in an appearance of the ring shape is determined as described above. When the coating liquid 9 is dripped on the coating surface 2 of the spectacle lens 1 in a spiral shape from the nozzle 20 of the dispenser 12, the tip of the nozzle 20 linearly moves from the intersecting point Q of the outer circumference of the spectacle lens 1 to the geometrical center or optical center of the spectacle lens 1.

Incidentally, when the coating liquid 9 is dripped from the nozzle 20 of the dispenser 12, a rotation state of the spectacle lens 1 held by the spin holder 11 and a moving state along the moving locus (operation straight line B) of the dispenser 12 are determined by the controller 13, in accordance with the shape data of the spectacle lens 1, particularly the lens outer diameter D1 of the spectacle lens 1.

According to this embodiment, when the coating liquid 9 is dripped on the coating surface 2 of the spectacle lens 1 from the nozzle 20 of the dispenser 12 in an appearance of the ring shape, the number of rotation of the spectacle lens 1 is set at a fixed number of rotation (for example, 15 rpm), and a rotation time of the spectacle lens 1 is set at 3 to 4 seconds in accordance with the lens outer diameter D1 of the spectacle lens 1. By way of an example, when the lens outer diameter D1 of the spectacle lens 1 is large, the rotation time of the spectacle lens 1 held by the spin holder 11 is set long.

Also, when the coating liquid 9 is dripped from the nozzle 20 of the dispenser 12 on the coating surface 2 of the spectacle lens 1 in a spiral shape, the number of rotation of the spectacle lens 1 is set at the fixed number of rotation (for example, 60 rpm), and the rotation time of the spectacle lens 1 is set at 7 to 12 seconds, for example, in accordance with the lens outer diameter D1 of the spectacle lens 1, and a moving speed of the dispenser 12 is set at a fixed speed, and a moving time of the dispenser 12 is set in accordance with the lens outer diameter D1 of the spectacle lens 1. By way of an example, when the lens outer diameter D1 of the spectacle lens 1 is large, the rotation time of the spectacle lens 1 held by the spin holder 11 is set long, and the moving time of the dispenser 12 is set long.

As described above, the rotation time of the spectacle lens 1 and the moving time of the dispenser 12 may not be determined by changing them in accordance with the lens outer diameter D1 of the spectacle lens 1, but may be determined by changing the number of rotation of the spectacle lens 1 and the moving speed of the dispenser 12. Alternately, the number of rotation and the rotation time of the spectacle lens 1 and the moving speed and the moving time of the dispenser 12 may be respectively determined by changing them in accordance with the lens outer diameter D1 of the spectacle lens 1.

When the coating liquid 9 is dripped from the nozzle 20 of the dispenser 12, an internal pressure of the dispenser 12 is adjusted, so that a dripping flow rate of the coating liquid 9 dripped from the nozzle 20 is fixed even if the viscosity of the coating liquid 9 is changed due to the change of a temperature of the coating liquid 9. For example, when the temperature of the coating liquid 9 becomes higher, and the viscosity of the coating liquid 9 is decreased, the internal pressure of the dispenser 12 is reduced, the dripping flow rate of the coating liquid 9 from the nozzle 20 is adjusted to be fixed.

In addition, after the coating liquid 9 is dripped from the nozzle 20 of the dispenser 12, in order to smooth the coating liquid 9 on the coating surface 2 of the spectacle lens 1, the spectacle lens 1 is rotated by the spin holder 11, by each number of rotation of a plurality of smoothing steps in which different numbers of rotation are set, respectively. In each smoothing step, a rotation state of the spectacle lens 1 held by the spin holder 11 is determined in accordance with the shape data of the spectacle lens 1 (particularly, convex curve BC on the coating surface 2 of the spectacle lens 1) and the viscosity of the coating liquid 9.

In this embodiment, the number of rotation of the spectacle lens 1 in each smoothing step is not changed, and in accordance with the convex curve BC of the coating surface 2 of the spectacle lens 1 and the viscosity of the coating liquid 9 due to the change of the temperature of the coating liquid 9, whether or not the coating liquid 9 dripped on the coating surface 2 of the spectacle lens 1 is easy to flow is taken into consideration, the rotation time of the spectacle lens 1 in each smoothing step is changed, and a photochromic film on the coating surface 2 of the spectacle lens 1 is adjusted. For example, when the convex curve BC of the spectacle lens 1 is deep, the temperature of the coating liquid 9 becomes higher, and when the viscosity of the coating liquid 9 is decreased, the coating liquid 9 is easy to flow on the coating surface 2 of the spectacle lens 1. Therefore, the rotation time of the spectacle lens 1 in each smoothing step is shortened, and the photochromic film applied on the coating surface 2 of the spectacle lens 1 is adjusted to become a prescribed film thickness.

As described above, instead of changing and determining the rotation time of the spectacle lens 1 in each smoothing step in accordance with the convex curve BC on the coating surface 2 of the spectacle lens 1 and the viscosity of the coating liquid 9, the number of rotation of the spectacle lens 1 in each smoothing step may be changed and determined in accordance with the convex curve BC on the coating surface 2 of the spectacle lens 1 and the viscosity of the coating liquid 9. Alternately, both of the number of rotation and the rotation time of the spectacle lens 1 in each smoothing step may be changed and determined.

Next, a coating (application) operation of the coating liquid 9 onto the spectacle lens 1 by the controller 13 of the coating device 10 will be explained by using the flowchart of FIG. 4.

First, the spectacle lens 1 carried to the spin holder 11 by a carrying device (not shown) is fixed and held on the spin holder 11 by an operation of negative pressure (step S1).

Next, the position of apex O on the coating surface 2 of the spectacle lens 1 held on the spin holder 11 is calculated based on the shape data (lens outer diameter D1) of the spectacle lens 1 stored in the data management server 14. Then, based on a value thus calculated, the dispenser motor 17 and the slide motor 18 are driven to move the dispenser 12, and the nozzle 20 of the dispenser 12 is positioned in the vicinity of the circumference of the spectacle lens 1, specifically, at a position deviated inward by dimension β from the outer circumference of the spectacle lens 1 (step S2).

In this state, the spin motor 16 is driven to rotate the spin holder 11 at a prescribed number of rotation (such as 15 rpm), and the spectacle lens 1 held on the spin holder 11 is rotated. At the same time, the dispenser 12 is operated, and one circumference of the coating liquid 9 is dripped in a ring shape onto the position deviated inward from the outer circumference of the spectacle lens 1 by dimension β in the vicinity of the circumference on the coating surface 2 of the spectacle lens 1 (step S3).

Next, the spin motor 16 is driven and the spin holder 11 is rotated at a prescribed number of rotation (such as 60 rpm), and at the same time, the dispenser 17 and the slide motor 18 are driven to move the tip of the nozzle 20 of the dispenser 12 toward the center (apex O) of the spectacle lens 1 so as to conform with an operation line B, and the coating liquid 9 is dripped in a spiral shape onto the coating surface 2 of the spectacle lens 1 (step S4). In these steps S3 and S4, the rotation time of the spectacle lens 1 by the spin holder 11 is determined, based on the lens outer diameter D1 of the spectacle lens 1.

Thereafter, the drip of the coating liquid 9 from the nozzle 20 of the dispenser 12 is stopped, and after a specified time of standby, with a rotation of the spectacle lens 1 continued or stopped, a state in which the dripped coating liquid 9 is spread over the coating surface 2 of the spectacle lens 1 and stably applied on the coating surface 2 is waited (step S5).

Next, the dispenser motor 17 is driven, and the edge spatula 21 is pressed on the coating liquid 9 on the coating surface 2 in the vicinity of the outer circumference of the spectacle lens 1, further, an edge sponge cylinder (not shown) is driven, and the edge sponge 22 is pressed onto the end face 4 of the spectacle lens 1 (step S6).

Thereafter, the spin motor 16 is driven, and a plurality of, for example, six stages of smoothing steps are executed, and the photochromic film applied on the coating surface 2 of the spectacle lens 1 is uniformly smoothened (step S7). In this step S7, the rotation time of the spectacle lens 1 in each smoothing step is determined, based on the convex curve BC on the coating surface 2 of the spectacle lens 1 and the viscosity of the coating liquid 9.

Each smoothing step is sequentially executed from the smoothing step of low number of rotation of the spectacle lens 1 to the smoothing step of high number of rotation, and after executing the smoothing step in which the number of rotation of the spectacle lens 1 is maximum, a plurality of smoothing steps in which the number of rotation of the spectacle lens 1 is sequentially decreased is executed in an orderly manner. For example, when the maximum number of rotation of the spectacle lens 1 is selected to be 600 rpm, each smoothing step in which the rotation speed of the spectacle lens 1 is 50 rpm, 150 rpm, 200 rpm, 600 rpm, 200 rpm, and 150 rpm is executed in this order.

While each smoothing step of step S7 is executed, the edge spatula 21 scrapes off an extra coating liquid 9 on the coating surface 2 of the spectacle lens 1, and the coating liquid 9 is applied on the end face 4 of the spectacle lens 1 and the extra coating liquid 9 is sponged off and removed by the edge sponge 22.

After each smoothing step is executed, the dispenser 17 and the edge sponge cylinder (not shown) is driven, to separate the edge spatula 21 and the edge sponge 22 from the spectacle lens 1 (step S8), and driving of the spin motor 16 is stopped to stop the rotation of the spectacle lens 1.

Finally, the negative pressure of the spin holder 11 is released, to release suction and fixing of the spectacle lens 1 by the spin holder 11 (step S9). The spectacle lens 1 is carried to a drying step by the carrying device. In the drying step, the photochromic film applied on the coating surface 2 of the spectacle lens 1 is cured and dried by irradiation of ultraviolet ray in a nitrogen gas atmosphere.

With a structure described above, according to this embodiment, the following effects (1) to (5) are exhibited.

(1) The coating liquid 9 having a photochromic function is dripped and applied in a ring shape in the vicinity of the outer circumference (the position deviated inward from the outer circumference by dimension β) on the coating surface 2 of the spectacle lens 1. Therefore, the coating liquid 9 can be uniformly applied without leaving an uncoated area, in the vicinity of the outer circumference. In addition, the coating liquid 9 is dripped in a spiral shape toward the geometrical center or the optical center of the spectacle lens 1 from the vicinity of the outer circumference on the coating surface 2 of the spectacle lens 1. Therefore, even if there is a difference of convex curve surface BC or the difference of spherical or aspherical surface on the coating surface 2 of the spectacle lens 1, the coating liquid 9 can be uniformly applied on the coating surface 2 of the spectacle lens 1. As a result, even if the coating liquid 9 has a high viscosity (25 to 500 cps at 25° C.), the photochromic film having a film thickness of several tens of μm (such as 30 μm) can be uniformly applied without leaving an uncoated area.

(2) The coating liquid 9 having the photochromic function is dripped in a spiral shape toward the geometrical center or the optical center of the spectacle lens 1 from the vicinity of the outer circumference (the position deviated inward from the outer circumference by dimension β) on the coating surface 2 of the spectacle lens 1. Therefore, the coating liquid 9 is newly dripped on the coating liquid 9 already dripped and flowing by the centrifugal force, and the coating liquid thus newly dripped is not wastefully discharged. Therefore, the dripped coating liquid 9 is always applied onto a part of the coating surface 2 of the spectacle lens 1 where coating liquid is not present. Thus, as described above, the coating liquid is not wastefully discharged, thus making it possible to make the coating liquid in a minimal necessary amount.

(3) The position of the nozzle 20 of the dispenser 12 is determined based on the shape data of the spectacle lens 1, and the moving locus of the nozzle 20 is determined. Therefore, the position of the nozzle 20 and the moving locus of the nozzle 20 can be determined in a short period of time, compared to the case in which it is determined by actually measuring the position of the spectacle lens 1 and based on a measurement data thus obtained, an entire coating work time can be shortened.

(4) The rotation state (rotation time and rotary speed) of the spectacle lens 1 on dripping the coating liquid 9 (coating liquid 9 having photochromic function) in a ring shape or spiral shape onto the coating surface 2 of the spectacle lens 1 from the nozzle 20 of the dispenser 12, is determined in accordance with the shape data of the spectacle lens 1 and particularly the outer diameter D1. Therefore, the coating liquid 9 can be uniformly applied on the coating surface 2 of the spectacle lens 1 with a minimum necessary amount without leaving an uncoated area.

(5) The rotation state (rotation time and rotary speed) of the spectacle lens 1 in each smoothing step after the coating liquid 9 (the coating liquid 9 having photochromic function) is dripped from the nozzle 20 of the dispenser 12 is determined in accordance with the shape data of the coating surface 2 of the spectacle lens 1 and particularly the convex curve BC and the viscosity of the coating liquid 9. Therefore, when the dripped coating liquid 9 is easy to flow on the coating surface 2 of the spectacle lens 1 by the convex curve BC of the coating surface 2 and the viscosity of the coating liquid 9, for example, by shortening the rotation time of the spectacle lens 1, a coating film (photochromic film) on the coating surface 2 of the spectacle lens 1 can be adjusted to a prescribed film thickness.

As described above, the present invention is explained based on the above-described embodiment, but the present invention is not limited thereto.

For example, in the above-described embodiment, the case that the object to be coated is the spectacle lens 1 is explained. However, the present invention is not limited thereto. For example, the present invention may be performed when the coating liquid having or not having the photochromic function is applied to a lens of optical equipment for a camera and a microscope. In addition, the present invention may be performed in the case that the object to be coated is a silicon wafer, a print wiring board, a planar type semiconductor element, a shadow mask, and a reflection preventing plate for television, etc, and the coating film is applied on these objects to be coated.

In addition, in this embodiment, explanation is given to the case that the coating liquid 9 is applied on the coating surface 2 having a convex curved shape of the spectacle lens 1. However, the present invention may be performed in the case that the coating liquid is dripped and applied on the coating surface having a planar shape and a concave shape.

Figure 1:
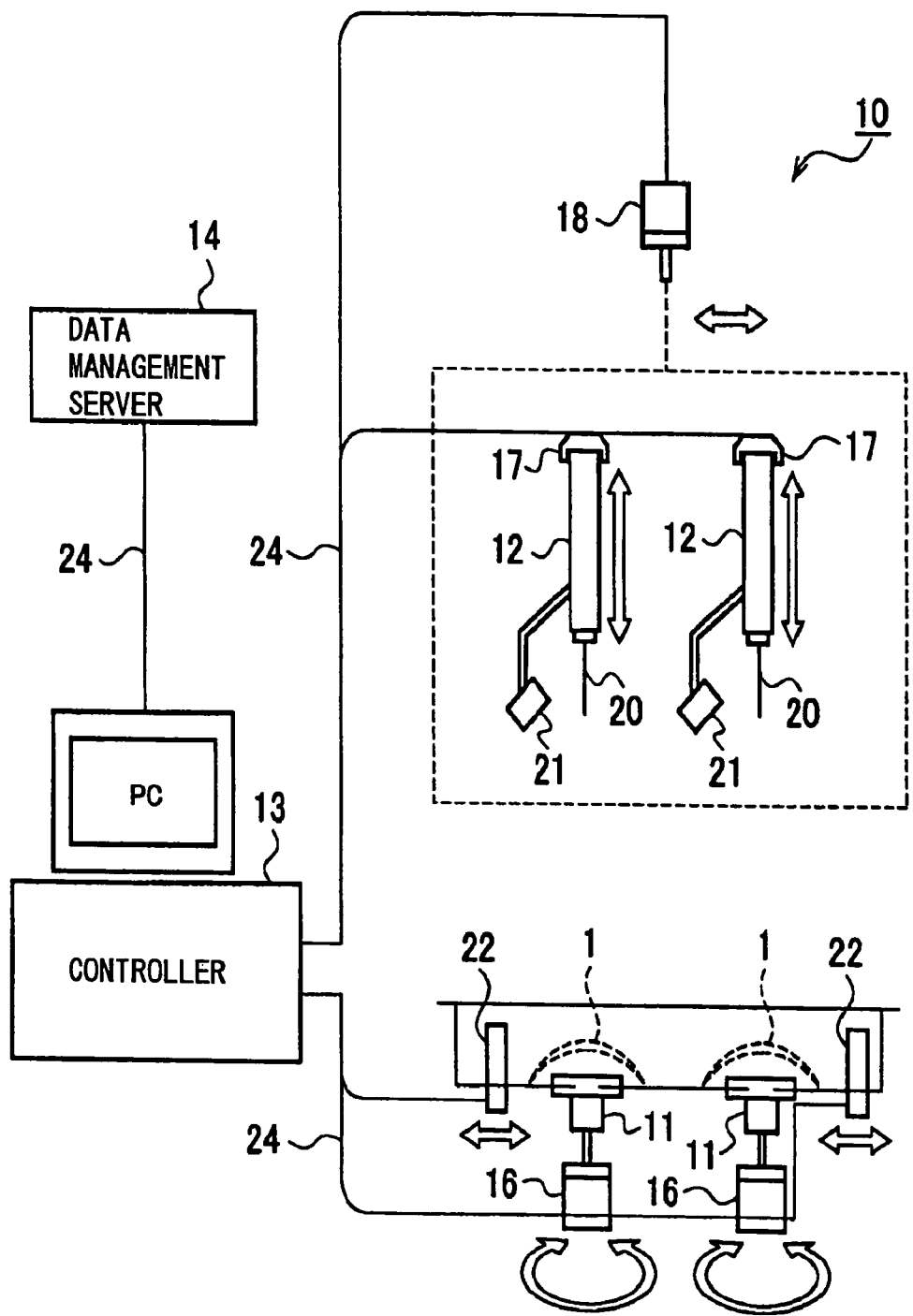
FIG. 1 is a block diagram schematically showing a coating apparatus for performing one embodiment of a manufacturing method of a photochromic lens according to the present invention.
Figure 2:
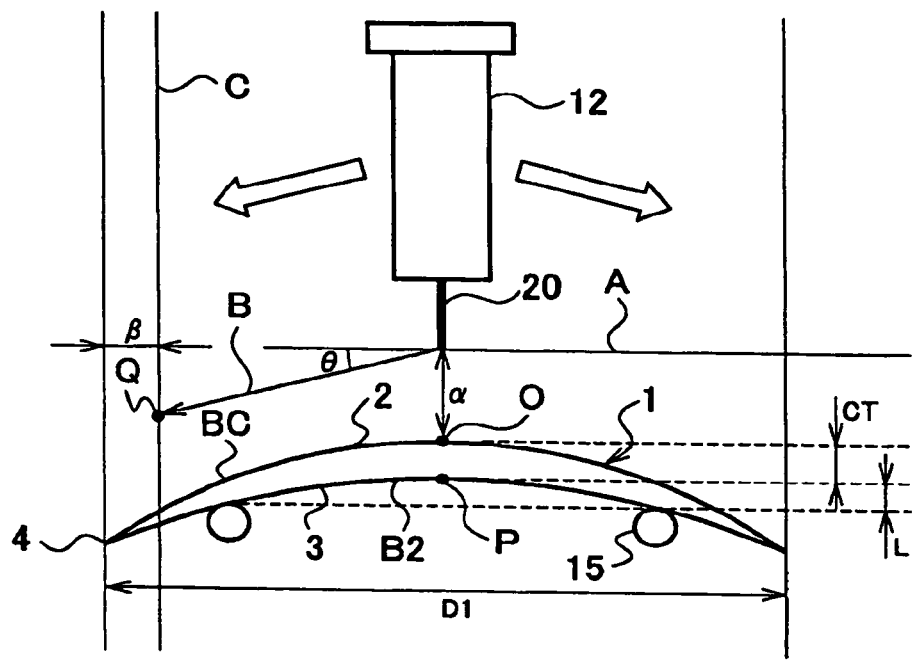
FIG. 2 is a side view schematically showing a positional relation between a dispenser and a spectacle lens of FIG. 1.
Figure 3:
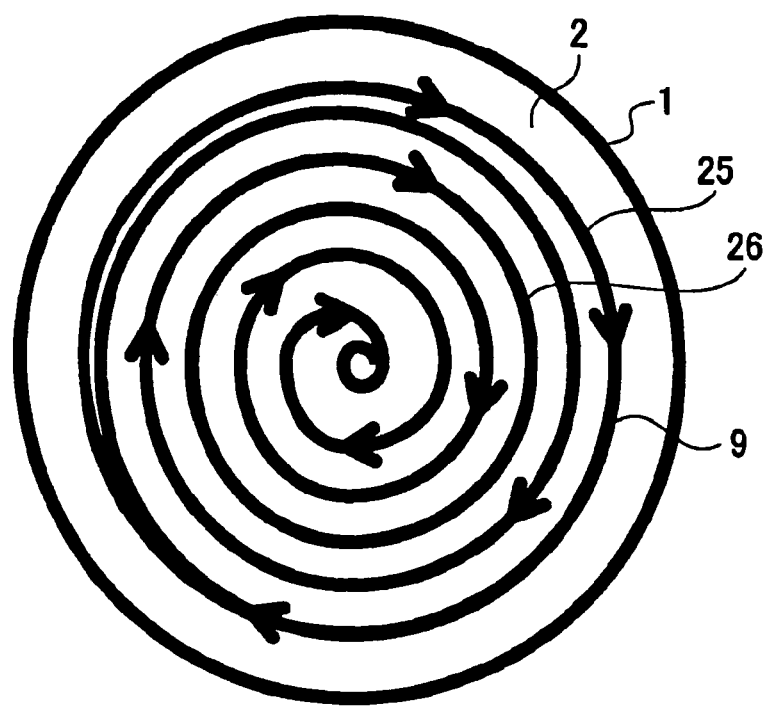
FIG. 3 is a plan view showing a drip state of a coating liquid on a lens coating surface by the dispenser.
Figure 4:
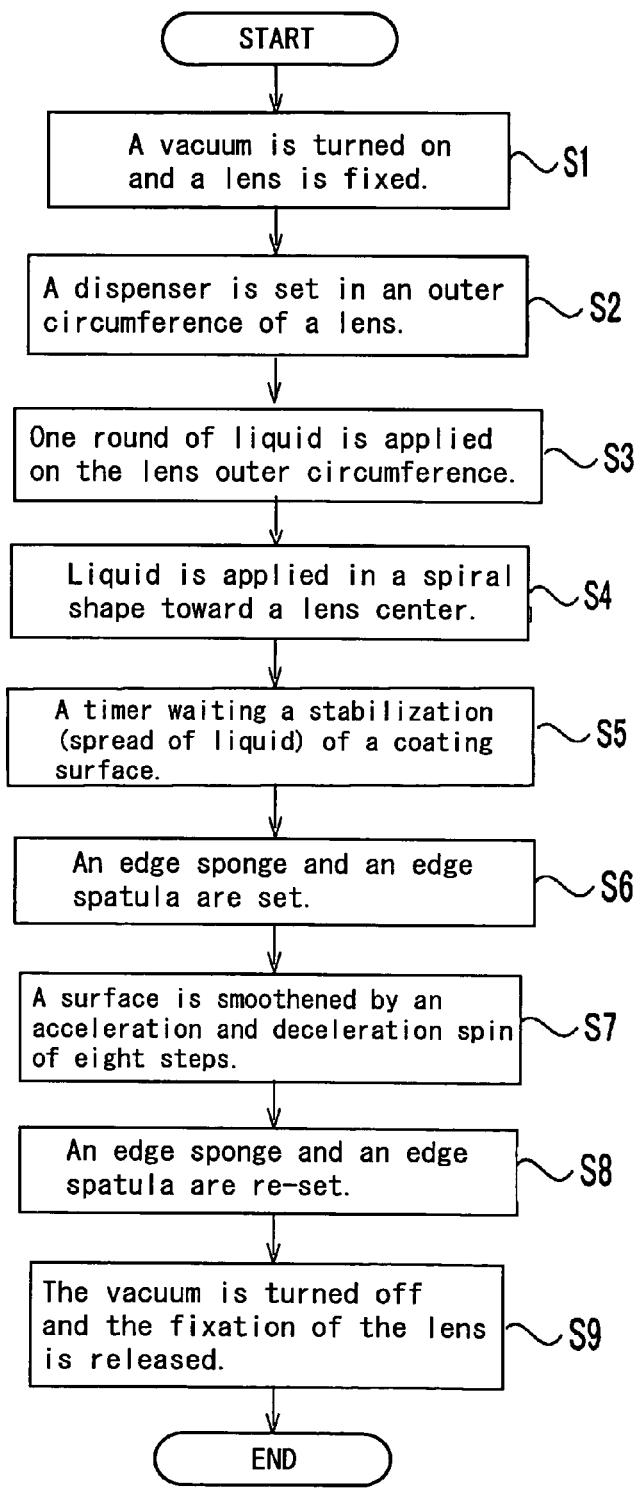
FIG. 4 is a flowchart showing a procedure of applying the coating liquid onto the lens coating surface by the coating apparatus of FIG. 1.

Description of Signs and Numerals
1 Spectacle lens (object to be coated)
2 Coating surface
3 Rear surface
4 End face (outer circumference)
9 Coating liquid
10 Coating apparatus
11 Spin holder
12 Dispenser (drip apparatus)
13 Controller
14 Data management server
16 Spin motor
17 Dispenser motor
18 Slide motor
20 Nozzle
25 Ring-shaped drip part
26 Spiral-shaped drip part
D1 Lens outer diameter of spectacle lens 1
BC Convex curve on coating surface of spectacle lens
B2 Concave curve on rear surface of spectacle lens
CT Center thickness of spectacle lens
n Refraction index of spectacle lens

What is claimed is:

1. A coating method of dripping and applying a coating liquid on a coating surface of an object to be coated, while rotating the object to be coated, the coating surface being formed into a convex curved shape, the method comprising:
dripping the coating liquid in a ring shape in a vicinity of an outer circumference on the coating surface of the object to be coated, and thereafter
dripping the coating liquid in a spiral shape toward a geometrical center or an optical center of the object to be coated from the vicinity of the outer circumference,
wherein a rotational speed of the object to be coated at a time of dripping the coating liquid in the ring shape, is set to be a smaller value than a rotational speed of the object to be coated at a time of dripping the coating liquid in the spiral shape, and
wherein the rotational speed of the object to be coated is constant when the coating liquid is dripped in the ring shape, and the rotational speed of the object to be coated is constant when the coating liquid is dripped in the spiral shape.

2. The coating method according to claim 1, wherein a viscosity of the coating liquid is 25 to 500 cps at 25° C.

3. A manufacturing method of a photochromic lens of dripping and applying a coating liquid having a photochromic function, on a coating surface of a lens while rotating the lens, and forming a coating film having the photochromic function on the coating surface of the lens, comprising:
dripping the coating liquid in a ring shape in a vicinity of an outer circumference on the coating surface of the lens, and thereafter
dripping the coating liquid in a spiral shape toward a geometrical center or an optical center of the lens from the vicinity of the outer circumference,
wherein a rotational speed of the lens at a time of dripping the coating liquid in the ring shape, is set to be a smaller value than a rotational speed of the lens at a time of dripping the coating liquid in the spiral shape, and
wherein the rotational speed of the lens is constant when the coating liquid is dripped in the ring shape, and the rotational speed of the lens is constant when the coating liquid is dripped in the spiral shape.

4. The manufacturing method of the photochromic lens according to claim 3, wherein the coating surface of the lens has a convex curved shape.

5. The manufacturing method of the photochromic lens according to claim 3, wherein a viscosity of the coating liquid is 25 to 500 cps at 25° C.

6. The manufacturing method of the photochromic lens according to claim 4, wherein a viscosity of the coating liquid is 25 to 500 cps at 25° C.

7. The manufacturing method of a photochromic lens according to claim 3,
wherein the dripping of the coating liquid in the ring shape is performed by positioning a nozzle provided so as to be vertically ascendable/descendable to the lens and provided so as to be horizontally moveable in a diameter direction of the lens in the vicinity of the outer circumference, and
the dripping of the coating liquid in the spiral shape is performed by moving the nozzle from the vicinity of the outer circumference to a geometrical center or an optical center of the lens.

8. The manufacturing method of the photochromic lens according to claim 7, wherein a position of the nozzle when the coating liquid is dripped in the ring shape, and a moving locus of the nozzle when the coating liquid is dripped in the spiral shape, are determined based on shape data of the lens.

9. The manufacturing method of the photochromic lens according to claim 8, wherein the position of the nozzle when the coating liquid is dripped in the ring shape, is determined based on an outer diameter of the lens and a convex surface curve of the coating surface.

10. The manufacturing method of the photochromic lens according to claim 7, wherein a rotation time of the lens and a moving time of the nozzle are set based on an outer diameter of the lens.

11. The manufacturing method of the photochromic lens according to claim 7, wherein a rotational speed of the lens and a moving speed of the nozzle are set based on an outer diameter of the lens.

12. The manufacturing method of the photochromic lens according to claim 7, wherein a rotational speed and rotation time of the lens and a moving speed and a moving time of the nozzle are set based on an outer diameter of the lens.

13. The manufacturing method of the photochromic lens according to claim 7, wherein even if a viscosity of the coating liquid is changed due to a change of a temperature of the coating liquid, a pressure for dripping the coating liquid is adjusted based on the temperature of the coating liquid so that dripping flow rate of the coating liquid is fixed.

14. The manufacturing method of the photochromic lens according to claim 7, further comprising smoothing the coating liquid on the coating surface after the dripping of the coating liquid in the spiral shape is ended.

15. The manufacturing method of the photochromic lens according to claim 14, wherein smoothing the coating liquid on the coating surface includes a plurality of smoothing steps, and a rotational speed of the lens in each smoothing step is set based on a convex surface curve of the coating surface and a viscosity of the coating liquid due to a change of a temperature.

16. The manufacturing method of the photochromic lens according to claim 14, wherein the smoothing the coating liquid on the coating surface includes a plurality of smoothing steps, and a rotation time of the lens in each smoothing step is set based on a convex surface curve of the coating surface of the lens and a viscosity of the coating liquid due to a change of a temperature.

17. The manufacturing method of the photochromic lens according to claim 14, wherein the smoothing the coating liquid on the coating surface includes a plurality of smoothing steps, and a rotational speed and a rotation time of the lens in each smoothing step is set based on a convex surface curve of the coating surface of the lens and a viscosity of the coating liquid due to a change of a temperature.

18. A manufacturing method of a photochromic lens of dripping and applying a coating liquid having a photochromic function, on a coating surface of a lens while rotating the lens, and forming a coating film having the photochromic function on the coating surface of the lens, comprising:
  holding the lens; thereafter,
  positioning a nozzle provided so as to be vertically ascendable and descendable to the lens and provided so as to be horizontally moveable in a diameter direction of the lens, in a vicinity of an outer circumference of the lens; thereafter,
  dripping the coating liquid in a ring shape in the vicinity of the outer circumference of the lens by the nozzle; thereafter,
  dripping the coating liquid on the coating surface in a spiral shape, by moving the nozzle from the vicinity of the outer circumference of the lens to a geometrical center or an optical center of the lens; thereafter,
  waiting for the coating liquid to spread over the coating surface; and thereafter,
  smoothing the coating liquid applied on the coating surface,
  wherein a rotational speed of the lens at a time of dripping the coating liquid in the ring shape, is set to be a smaller value than a rotational speed of the lens at a time of dripping the coating liquid in the spiral shape, and
  wherein the rotational speed of the lens is constant when the coating liquid is dripped in the ring shape, and the rotational speed of the lens is constant when the coating liquid is dripped in the spiral shape.

* * * * *